US009844306B1

(12) United States Patent
Fitzpatrick

(10) Patent No.: US 9,844,306 B1
(45) Date of Patent: Dec. 19, 2017

(54) DOWNDRAFT TABLE FOR CLEANING ELECTRONIC EQUIPMENT

(76) Inventor: Daniel Fitzpatrick, Stone Harbor, NJ (US)

( * ) Notice: Subject to any disclaimer, the term of this patent is extended or adjusted under 35 U.S.C. 154(b) by 1603 days.

(21) Appl. No.: 13/136,693

(22) Filed: Aug. 8, 2011

(51) Int. Cl.

| | |
|---|---|
| ***A47L 5/14*** | (2006.01) |
| ***E01H 1/08*** | (2006.01) |
| ***B08B 5/02*** | (2006.01) |
| *A01G 1/12* | (2006.01) |
| *A47L 9/02* | (2006.01) |
| *A47L 9/28* | (2006.01) |

(52) U.S. Cl.
CPC *A47L 5/14* (2013.01); *B08B 5/02* (2013.01); *E01H 1/0809* (2013.01); *A01G 1/125* (2013.01); *A47L 9/02* (2013.01); *A47L 9/2842* (2013.01)

(58) Field of Classification Search
CPC ............ A47L 5/14; A47L 9/02; A47L 9/2842; E01H 1/0809; A01G 1/125; B08B 5/02
USPC ...... 15/302, 303, 405; 134/18, 21, 108, 109, 134/95.1
See application file for complete search history.

(56) References Cited

U.S. PATENT DOCUMENTS 3,503,257 A * 3/1970 McElhaney et al. .... 73/862.041
3,757,218 A * 9/1973 Oliverio et al. .............. 324/156
6,222,155 B1 4/2001 Blackmon et al.
6,616,720 B1 * 9/2003 Smith .......................... 55/385.2
7,147,723 B2 12/2006 Unagami
7,284,293 B1 10/2007 Holder et al.
2002/0026682 A1 * 3/2002 Yamaguchi ..................... 15/302
2002/0086632 A1 * 7/2002 Stemm .......................... 451/526
2007/0107752 A1 * 5/2007 Fuchigami et al. ............ 134/21
2007/0186961 A1 * 8/2007 Seasly et al. ................ 134/95.1
2011/0122377 A1 * 5/2011 Nagahashi ...................... 355/30

FOREIGN PATENT DOCUMENTS

WO PCT/BR/98/00082 10/1998

* cited by examiner

*Primary Examiner* — Robert Scruggs
(74) *Attorney, Agent, or Firm* — Norman E. Lehrer

(57) ABSTRACT

A downdraft table for cleaning electronic equipment includes a housing in the form of a cabinet having a grid-like upper surface with openings therein. A fan located within the housing below the upper surface draws air from above the surface downwardly through the grid. An air compressor and compressed air storage tank are also located within the housing below the upper surface for producing a source of compressed air and a hose is connected to the compressed air storage tank and extends upwardly above the upper surface. An air nozzle connected to the hose allows a workman to direct compressed air toward a piece of electronic equipment located on the upper surface. The upper surface preferably includes a turntable that is adapted to support the piece of electronic equipment thereby allowing the equipment to be rotated about a vertical axis as it is being cleaned. In addition, a ground wire is connected to the housing and has a spring clip at the distal end thereof which is adapted to be connected to the piece of electronic equipment for grounding the same.

4 Claims, 4 Drawing Sheets

DOWNDRAFT TABLE FOR CLEANING ELECTRONIC EQUIPMENT

BACKGROUND OF THE INVENTION

The present invention is directed toward a downdraft table and more particularly, toward a downdraft table that is particularly adapted for use in cleaning electronic equipment such as computers and the like.

Downdraft tables are, per se, well known in various arts. They are comprised essentially of a table or supporting work surface on which various manufacturing or fabricating activities can be carried out. The table is normally in the form of a grid or perforated surface and includes a fan below the table surface that draws fumes or airborne particulate matter downwardly to protect the workman from the same. A filter is frequently located between the fan and the table surface to capture noxious fumes or particulate matter before the filtered air is expelled into the surrounding atmosphere.

Downdraft tables have also been used for cleaning various articles or pieces of equipment. This is necessary when the cleaning process produces gases or debris or particles (such as dust) that must be removed and this is particularly true if the gases or particles may be harmful to the worker cleaning the equipment.

It is well known that computers or similar pieces of electronic equipment accumulate significant amounts of dust that can interfere with their operation by causing overheating or other problems. It is believed that downdraft tables could be useful when cleaning such pieces of equipment. However, the cleaning of computers is usually done using compressed air and, most frequently, canned compressed air. Such cans do not hold very much air and are useful, therefore, for relatively small cleaning jobs. Larger cleaning jobs would require several cans or an alternate source of compressed air. To Applicant's knowledge, no one has ever proposed combining a source of compressed air with a downdraft table so that computers and other electronic equipment could be efficiently and economically cleaned on the table.

Thus, there is a need for a downdraft table with a source of compressed air that can be used for cleaning computers and other electronic equipment.

SUMMARY OF THE INVENTION

The present invention is designed to overcome the deficiencies of the prior art discussed above. It is an object of the present invention to provide a downdraft table that is particularly adapted for use in cleaning electronic equipment such as computers and the like.

It is another object of the present invention to provide a downdraft table for cleaning electronic equipment that includes a source of compressed air for use in cleaning.

It is an even further object of the present invention to provide a downdraft table that is particularly adapted for use in cleaning computers or other electronic equipment that can protect the equipment from damage by grounding the same.

In accordance with illustrative embodiments demonstrating features and advantages of the present invention, there is provided a downdraft table for cleaning computers and other electronic equipment that includes a housing in the form of a cabinet having a grid-like upper support surface with openings therein. A fan located within the housing below the upper support surface draws air from above the surface downwardly through the grid. An air compressor and compressed air storage tank are also located within the housing below the upper support surface for producing a source of compressed air and a hose is connected to the compressed air storage tank and extends upwardly above the upper support surface. An air nozzle connected to the hose allows a workman to direct compressed air toward a piece of electronic equipment located on the upper support surface. The upper support surface preferably includes a turntable that is adapted to support the piece of electronic equipment thereon thereby allowing the equipment to be rotated about a vertical axis as it is being cleaned with the compressed air. In addition, a ground wire is connected to the housing and extends downwardly from above the upper support surface. The ground wire includes a spring clip at the distal end thereof which is adapted to be connected to the piece of electronic equipment for grounding the same.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form that is presently preferred; it being understood that the invention is not intended to be limited to the precise arrangements and instrumentalities shown.

DETAILED DESCRIPTION OF THE PREFERRED EMBODIMENT

Figure 1:
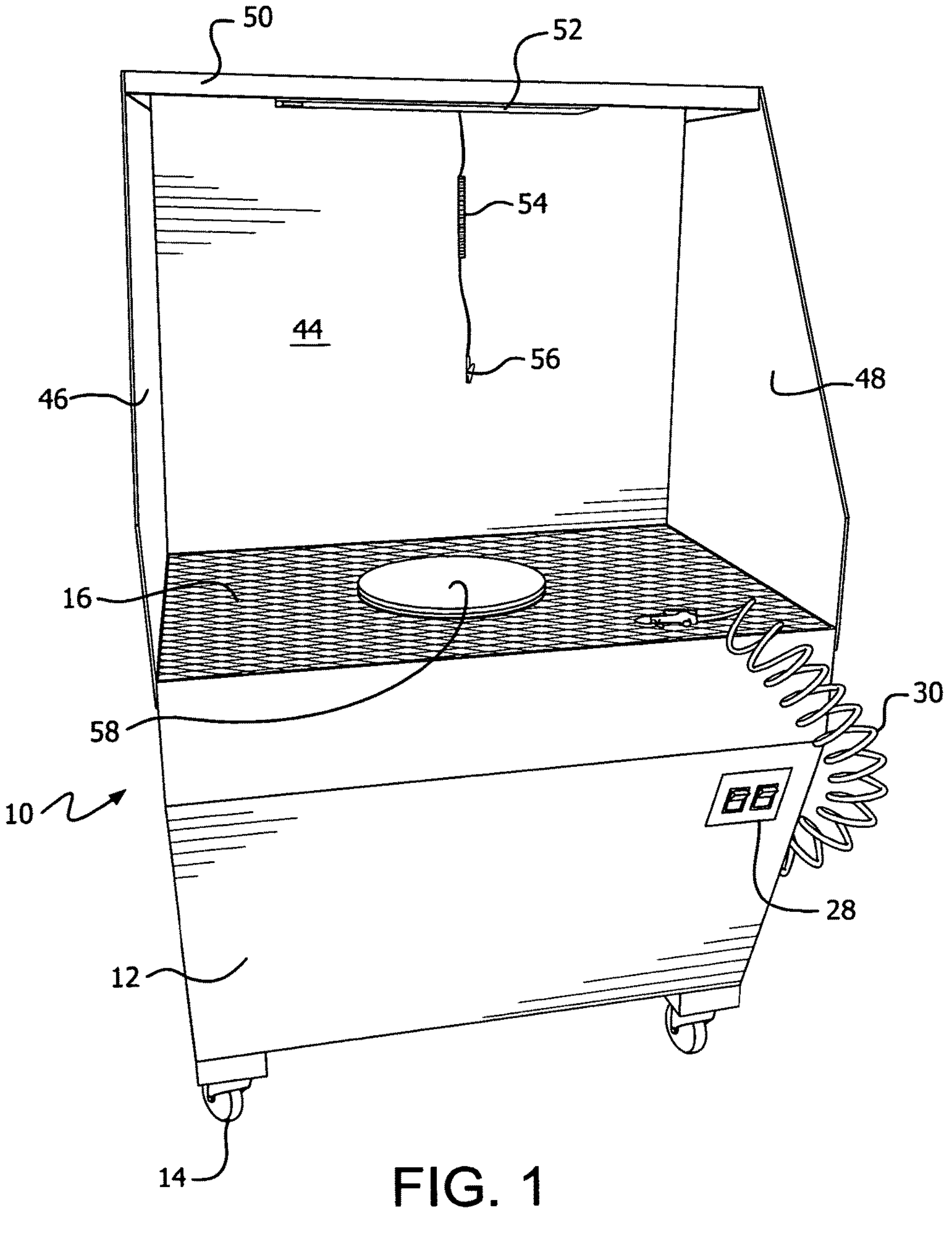
FIG. 1 is a front perspective view of a downdraft table of the invention for use in cleaning electronic equipment.

Referring now to the drawings in detail wherein like reference numerals have been used throughout the various figures to designate like elements, there is shown in FIG. 1 a downdraft table that is particularly adapted for use in cleaning electronic equipment such as computers and the like constructed in accordance with the principles of the present invention and designated generally as 10.

Figure 5:
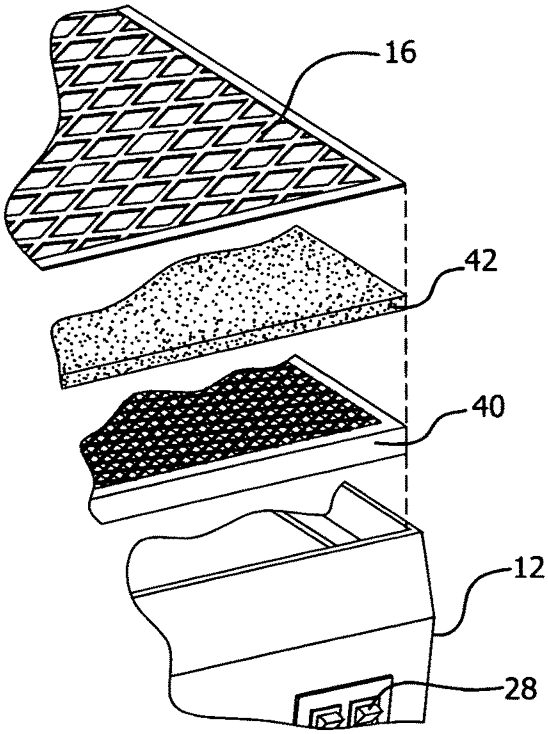
FIG. 5 is a partial exploded perspective view illustrating the details of the filtering system of the invention.

The downdraft table 10 includes a housing 12 in the form of a cabinet which may be mounted on wheels 14 so as to be movable. The housing 12 includes an upper support surface 16 which is in the form of a grid with openings therein as is best seen in FIG. 5. As shown most clearly in FIG. 2, located beneath the upper support surface 16 and within the housing or cabinet 12 is a fan 18 which draws air from above the surface 16 downwardly through the grid 16. The air is then exhausted through the bottom 20 of the housing 12. The air flow is illustrated by the arrows shown in FIG. 2. All of the foregoing is somewhat conventional and is similar to other downdraft tables currently available in the marketplace.

Figure 2:
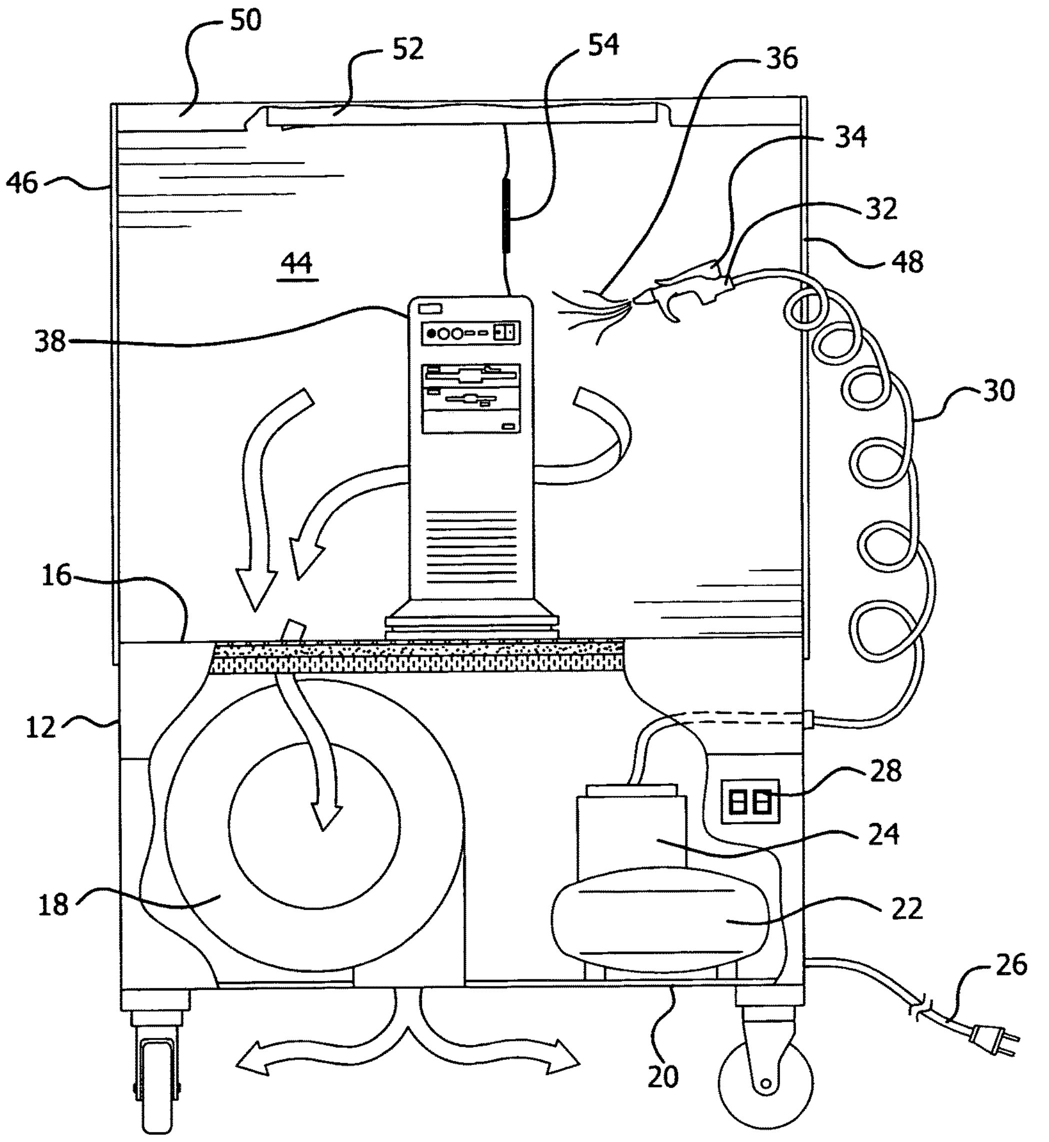
FIG. 2 is a front elevational view and partial cross-sectional view with portions broken away to expose some of the inner components of the invention.
Figure 3:
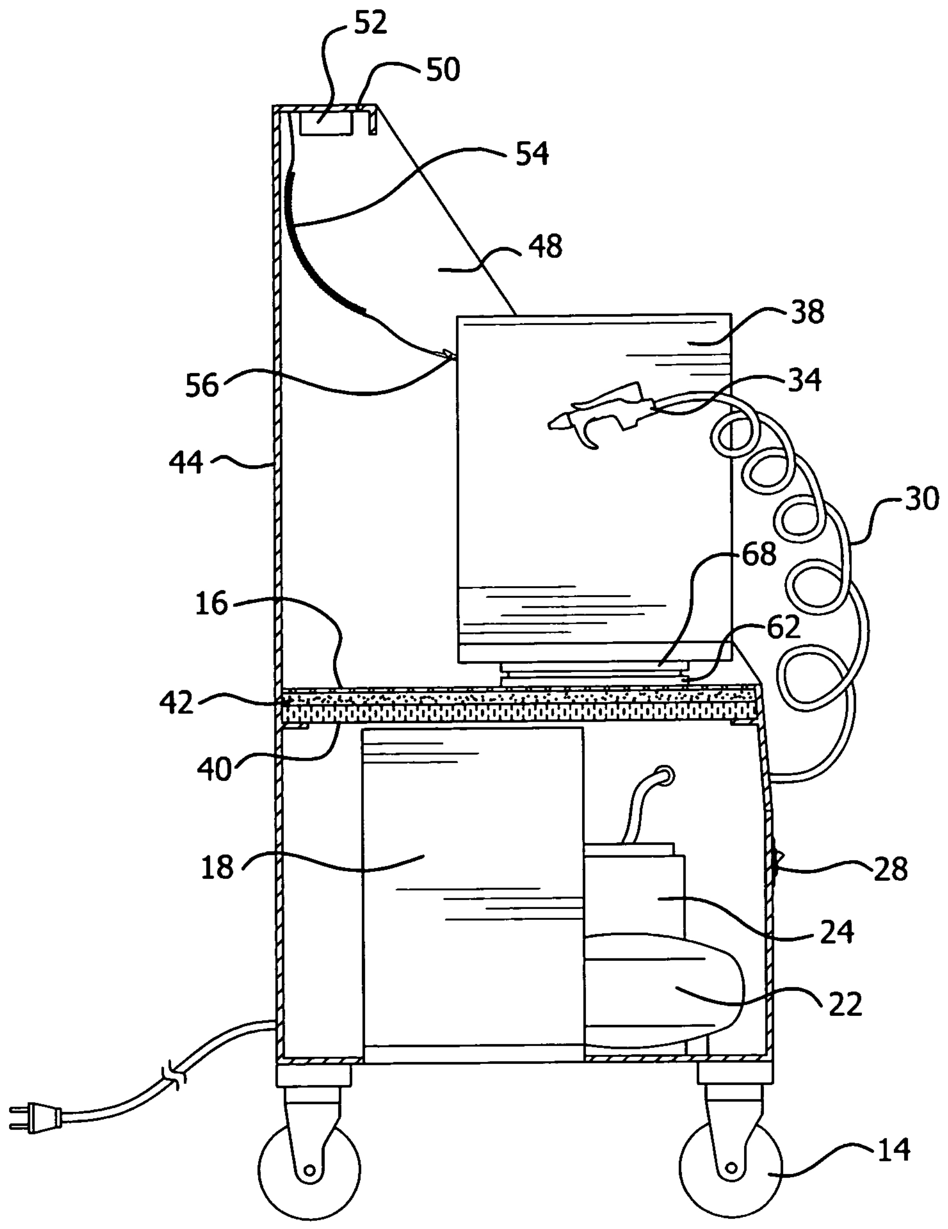
FIG. 3 is a left side elevational view of FIG. 2 with portions broken away.

As shown most clearly in FIG. 2, also located within the housing 12 and below the upper support surface 16 are an air compressor 22 and a compressed air storage tank 24. Power to the fan 18 and to the air compressor 22 is provided through the electrical cord 26 which can be plugged into a standard 110 volt outlet. Switches 28 at the front of the housing 12 can be used to control the fan 18 and the air compressor 22 in the manner well known in various arts.

Connected to the compressed air storage tank 24 is a flexible hose 30 that can extend upwardly above the upper support surface 16. An air nozzle 32 which can be selectively operated by pressing the trigger 34 is used to direct compressed air 36 toward a piece of electronic equipment such as shown at 38 located on the upper support surface 16.

In the embodiment of the invention shown in the figures, the electronic equipment 38 is illustrated as a personal computer. It should be readily apparent to those skilled in the art that the invention can be used to clean substantially any type of electronic equipment. Dust, dirt and other debris that is blown out of the computer 38 through the use of the compressed air 36 is drawn down through the upper support surface 16 by the air flow caused by the fan 18.

To prevent contaminated air from being exhausted to the surrounding atmosphere through the bottom of the housing 12, one or more filters such as shown at 40 and 42 are located beneath the support surface 16. As shown, the filter 40 may be of the pleated synthetic fabric type contained within an outer frame while the filter 42 may be an unwoven or woven mat or foam-type filter. As should be readily apparent, however, various different types of filters may be used. It is preferable that the filters 40 and 42 be washable and reusable.

In the preferred embodiment of the invention, the housing 12 is constructed entirely of sheet metal and includes a back wall 44 and left and right side walls 46 and 48, all of which extend upwardly above the upper support surface 16. A top wall 50 which may include an electric light 52 is secured to the upper edges of the walls 44, 46 and 48. The top wall 50 and the walls 44, 46 and 48 form somewhat of an enclosure to help contain dust and other debris that is being cleaned out of the electronic equipment 38. To improve the portability of the table 10, it is also possible to construct any or all of the walls 44, 46, 48 and 50 so as to be easily removable (preferably without the need for tools) or to have them capable of folding out of the way.

Although the table 10 is referred to as a downdraft table and is arranged such that air is drawn downwardly through the support surface 16, it is not beyond the scope of the present invention to construct the support surface 16 as a solid surface and to locate the filters in the back wall 44. It is also possible to include filters in both the back wall 44 and the support surface 16.

Figure 4:
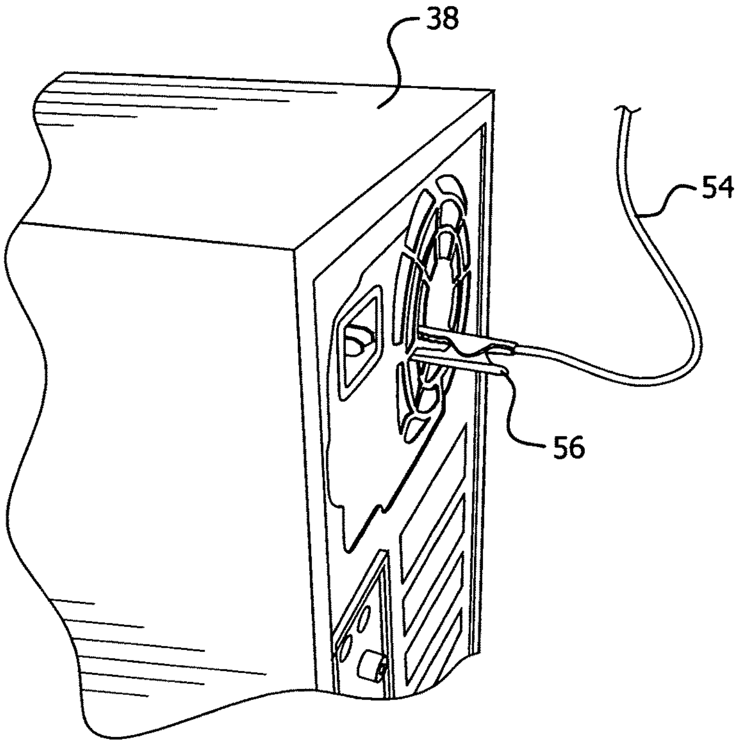
FIG. 4 is a rear perspective view showing the ground wire connected to the rear of a computer being cleaned.

It is known in the art that static electricity can sometimes build up when equipment is being cleaned utilizing compressed air. It is also known that this static electricity can sometimes damage sensitive parts of the electronic equipment. To help prevent such damage, the spring coiled ground wire 54 has one end secured to the top 50 of the housing 12 and includes an alligator clip or other type of spring clip 56 at the distal end thereof. As best shown in FIG. 4, the spring clip 56 is secured to the metal chassis (or to any other desired part) of the computer 38 in order to ground the same and prevent the buildup of static electricity.

In order to facilitate the cleaning of the computer 38 from various sides, a turntable 58 is located on the upper support surface 16. The turntable 58 can take various forms. It may, for example, have an upper circular surface such as shown with a vertical axle extending downwardly with a bearing allowing rotation of the turntable. Alternatively, the turntable 58 could be in the nature of a lazy susan having upper and lower discs such as shown at 60 and 62 that rotate relative to each other in a known manner. In such a case, the turntable 58 would simply rest on the top of the upper support surface 16.

The present invention may be embodied in other specific forms without departing from the spirit or essential attributes thereof and accordingly, reference should be made to the appended claims rather than to the foregoing specification as indicating the scope of the invention.

I claim:

1. A downdraft table for cleaning electronic equipment comprising:

a metal housing having an upper support surface, said upper support surface being in the form of a grid with openings therein;

a fan located within said housing below said upper support surface, said fan drawing air from above said surface downwardly through said grid;

an air compressor and compressed air storage tank located within said housing below said upper support surface for producing a source of compressed air for cleaning;

a hose connected to said compressed air storage tank and extending upwardly above said upper support surface;

an air nozzle connected to said hose which allows a workman to direct compressed air toward a piece of electronic equipment located on said upper support surface, and a ground wire connected to said housing and having a spring clip at the distal end thereof, said spring clip being adapted to be connected to said piece of electronic equipment for grounding the same.

2. The downdraft table for cleaning electronic equipment as claimed in claim 1 wherein said housing includes a back wall and side walls, all of said walls extending above said upper support surface.

3. The downdraft table for cleaning electronic equipment as claimed in claim 2 further including at least a partial top wall located adjacent the tops of said side and back walls, said ground wire being connected to said top wall and extending downwardly therefrom.

4. The downdraft table for cleaning electronic equipment as claimed in claim 1 further including a turntable on said upper support surface, said turntable being adapted to support said piece of electronic equipment while allowing the equipment to be rotated about a vertical axis for cleaning.

* * * * *